United States Patent
Fukutake

(10) Patent No.: US 9,599,808 B2
(45) Date of Patent: Mar. 21, 2017

(54) MICROSCOPE APPARATUS

(71) Applicant: Nikon Corporation, Chiyoda-ku, Tokyo (JP)

(72) Inventor: Naoki Fukutake, Tokyo (JP)

(73) Assignee: Nikon Corporation, Tokyo (JP)

( * ) Notice: Subject to any disclaimer, the term of this patent is extended or adjusted under 35 U.S.C. 154(b) by 246 days.

(21) Appl. No.: 14/491,591

(22) Filed: Sep. 19, 2014

(65) Prior Publication Data

US 2015/0009315 A1    Jan. 8, 2015

Related U.S. Application Data

(63) Continuation of application No. PCT/JP2013/064023, filed on May 21, 2013.

(30) Foreign Application Priority Data

Jun. 5, 2012    (JP) ................................ 2012-127911

(51) Int. Cl.
*H04N 7/18* (2006.01)
*G02B 21/36* (2006.01)
(Continued)

(52) U.S. Cl.
CPC ........... *G02B 21/365* (2013.01); *G02B 21/06* (2013.01); *G02B 21/361* (2013.01); *G02B 27/46* (2013.01)

(58) Field of Classification Search
CPC .... G02B 21/365; G02B 21/361; G02B 21/06; G02B 27/46
(Continued)

(56) References Cited

U.S. PATENT DOCUMENTS

2003/0030902 A1* 2/2003 Fukushima ............ G02B 21/14
359/388
2011/0013136 A1  1/2011 Archambeau et al.
(Continued)

FOREIGN PATENT DOCUMENTS

JP      08-220568 A    8/1996
JP   2003-121749 A    4/2003
(Continued)

OTHER PUBLICATIONS

International Search Report from International Patent Application No. PCT/JP2013/064023, Jul. 23, 2013.
(Continued)

*Primary Examiner* — Allen Wong
(74) *Attorney, Agent, or Firm* — Shapiro, Gabor and Rosenberger, PLLC

(57) ABSTRACT

A microscope apparatus includes: a light source; an illumination optical system configured to illuminate a specimen with light from the light source, the illumination optical system having a spatial light modulation element capable of adjusting a light intensity distribution; an imaging optical system configured to image light from the specimen; a solid-state imaging device configured to generate an image of the specimen based on light from the imaging optical system; and a controller capable of adjusting the spatial light modulation element, the controller being configured to, based on a first image output from the solid-state imaging device when the specimen is illuminated with first illumination light, adjust the spatial light modulation element and illuminate the specimen with second illumination light.

20 Claims, 10 Drawing Sheets

(51) Int. Cl.
  *G02B 21/06* (2006.01)
  *G02B 27/46* (2006.01)
(58) Field of Classification Search
  USPC .......................................................... 348/79
  See application file for complete search history.

(56) References Cited

U.S. PATENT DOCUMENTS

| | | |
|---|---|---|
| 2012/0099172 A1 | 4/2012 | Ohki |
| 2012/0262561 A1 | 10/2012 | Fukutake et al. |
| 2012/0262562 A1 | 10/2012 | Fukutake et al. |
| 2012/0293644 A1 | 11/2012 | Fukutake et al. |

FOREIGN PATENT DOCUMENTS

| | | |
|---|---|---|
| JP | 2009-237109 A | 10/2009 |
| JP | 2010-507119 A | 3/2010 |
| JP | 2012-088530 A | 5/2012 |
| JP | 2012-220801 A | 11/2012 |
| JP | 2012-222672 A | 11/2012 |
| JP | 2012-242532 A | 12/2012 |
| WO | WO 2008/046858 A1 | 4/2008 |
| WO | WO 2012/053657 A2 | 4/2012 |
| WO | WO 2012/140939 A1 | 10/2012 |
| WO | WO 2012/140940 A1 | 10/2012 |
| WO | WO 2012/157295 A1 | 11/2012 |

OTHER PUBLICATIONS

Written Opinion of the International Searching Authority from International Patent Application No. PCT/JP2013/064023, Jul. 23, 2013.

Office Action issued Feb. 17, 2015, in Japanese Patent Application No. 2014-519909.

* cited by examiner

MICROSCOPE APPARATUS

CROSS-REFERENCE TO RELATED APPLICATION

This is a Continuation Application of International Application No. PCT/JP2013/064023 filed on May 21, 2013, which claims priority on Japanese Patent Application No. 2012-127911 filed on Jun. 5, 2012. The contents of the aforementioned applications are incorporated herein by reference.

BACKGROUND

Field of the Invention

The present invention relates to a microscope apparatus used to observe a specimen.

Background

In the related art, a bright field microscope, a phase contrast microscope, or the like is used as an optical microscope apparatus. In the bright field microscope of the microscopes, the light intensity distribution of illumination light is adjusted by adjusting a circular diaphragm variably. Alternatively, based on the determination of an observer, a diaphragm may be selected from diaphragms each having a different shape and used. On the other hand, in the phase contrast microscope, the light intensity distribution of illumination light is formed using a ring diaphragm and a phase ring.

Since the light intensity distribution of illumination light has a large influence on an image of a specimen which is an observation target, modifications are made to the above-described circular diaphragm, ring diaphragm, phase ring, and the like, and a variety of designs have been proposed such that a good image of a specimen can be obtained (for example, refer to Japanese Unexamined Patent Application Publication No. 2009-237109).

For example, in Japanese Unexamined Patent Application Publication No. 2009-237109, a phase contrast microscope, in which a modulation unit is provided so as to surround a ring region of a phase ring provided in a ring shape, which is formed such that the transmission axis direction of the modulation unit is different from that of a region other than the modulation unit, and thereby which is capable of varing a contrast continuously, is disclosed.

SUMMARY

However, in the above-described microscope apparatus of the related art, since the shape of the diaphragm is fixed within a certain range, the adjustment of the light intensity distribution of illumination light is limited. In addition, when the shape of the diaphragm is selected, since the shape is selected on the basis of the judgement or the experience of the observer, the shape of the diaphragm is not necessarily a shape with which the image of a specimen under observation can be observed under optimum conditions. Moreover, in the case of the phase contrast microscope, since the position of the ring diaphragm and the position of the phase ring are fixed, it is impossible to select the shape of the ring diaphragm and the shape of the phase ring freely, and it is difficult to observe a specimen under optimum conditions.

An object of an aspect of the present invention is to provide a microscope apparatus capable of observing a specimen under optimum conditions by optimizing a light intensity distribution of illumination light with which the specimen is irradiated and obtaining a good image of the specimen.

According to an aspect of the present invention, there is provided a microscope apparatus including: a light source; an illumination optical system configured to illuminate a specimen with light from the light source, the illumination optical system having a spatial light modulation element capable of adjusting a light intensity distribution; an imaging optical system configured to image light from the specimen; a solid-state imaging device configured to generate an image of the specimen based on light from the imaging optical system; and a controller capable of adjusting the spatial light modulation element, the controller being configured to, based on a first image output from the solid-state imaging device when the specimen is illuminated with first illumination light, adjust the spatial light modulation element and illuminate the specimen with second illumination light.

According to an aspect of the present invention, there is provided a microscope apparatus capable of observing a specimen under optimum conditions by optimizing a light intensity distribution of illumination light with which the specimen is irradiated and obtaining a good image of the specimen.

DESCRIPTION OF THE EMBODIMENTS

Figure 1:
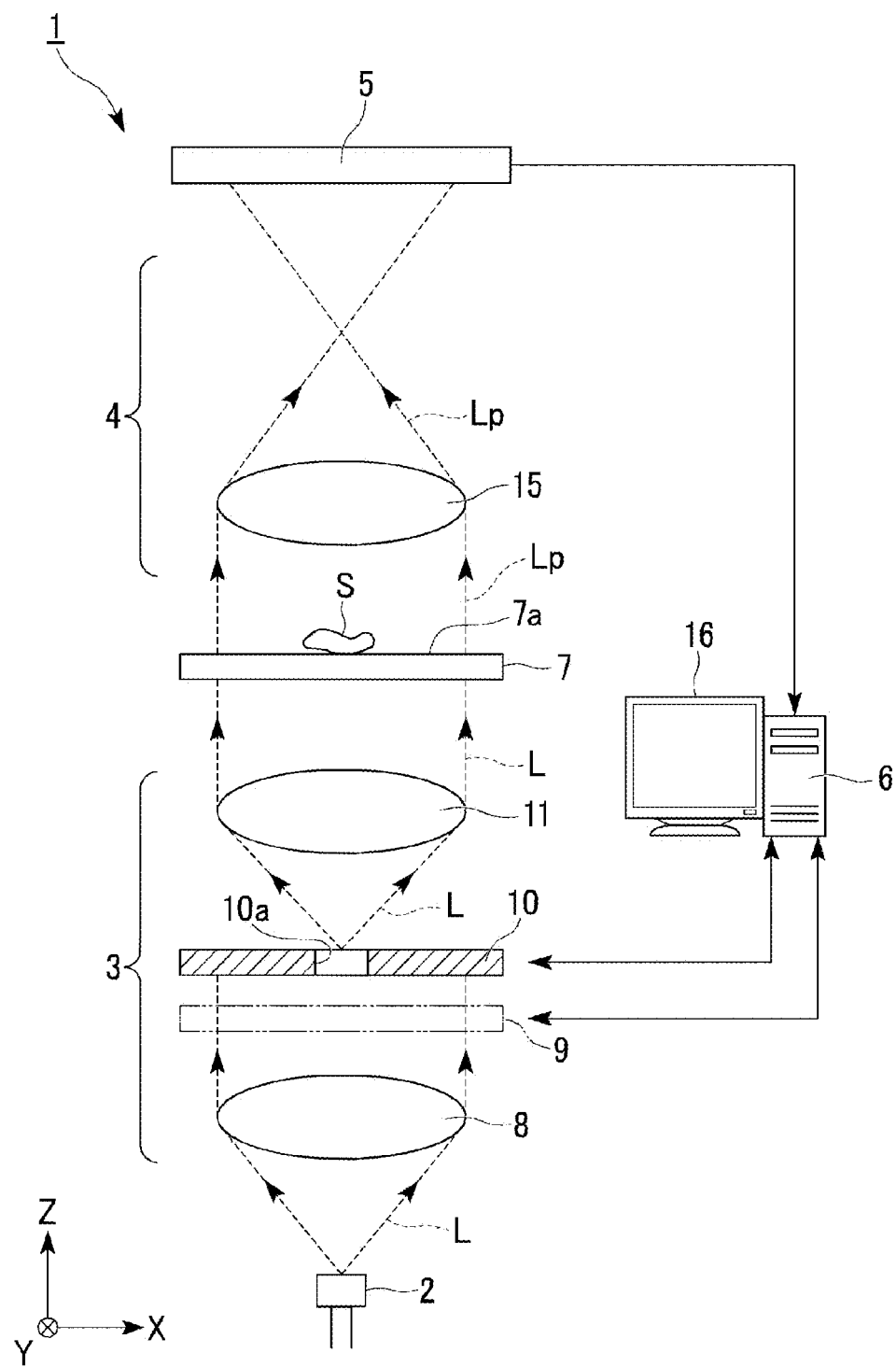
FIG. 1 is a schematic configuration view of a microscope apparatus shown as a first embodiment.

Hereinafter, embodiments of the present invention will be described with reference to the drawings.

Note that, in the drawings used in the following description, feature sections may be schematically represented for the sake of convenience so that the features can be easily understood. In addition, the scale or the like of each configuration element is not necessarily the same as the actual scale.

First Embodiment

First, a microscope apparatus 1 shown in FIG. 1 will be described as a first embodiment.

Note that, FIG. 1 is a schematic configuration view of the microscope apparatus 1 shown as the first embodiment.

The microscope apparatus 1 shown in FIG. 1 as the first embodiment configures a bright field microscope used to irradiate a specimen S which is an observation target with illumination light L and to observe a magnified image of the specimen S obtained by transmitted light from the specimen S.

Specifically, this microscope apparatus 1 includes: a light source 2 that emits illumination light L; an illumination optical system 3 that irradiates a specimen S with the illumination light L from the light source 2; an imaging optical system 4 that images transmitted light Lp from the specimen S; a solid-state imaging device 5 that receives the transmitted light Lp imaged by the imaging optical system 4, converts the transmitted light into an electric signal, and generates an image of the specimen S; and a controller 6 that controls each unit.

A stage 7 is provided between the illumination optical system 3 and the imaging optical system 4. The stage 7 has an installation surface 7a on which the specimen S is placed. In addition, the stage 7 is operable to be moved in two directions perpendicular to each other in the plane of the stage (an X-axis direction and a Y-axis direction shown in FIG. 1). Thereby, it is possible to arbitrarily change an observation position of the specimen S.

Moreover, the stage 7 may be configured to be operable to be moved in a height direction (a Z-axis direction shown in FIG. 1).

In the following description, an optical axis (a central axis of a beam) of the illumination light L emitted from the light source 2 is set to the Z-axis direction, and two directions perpendicular to each other in a plane perpendicular to this Z-axis are set to the X-axis direction and the Y-axis direction. Note that, in FIG. 1, the illumination light L emitted from the light source 2 is schematically represented by a dashed line.

The light source 2 irradiates the specimen, for example, with visible light such as white light or light in a wavelength range adjacent to the visible wavelength range as the illumination light L. In the light source 2, it is possible to use light from an external light source such as natural light, white fluorescent light, or a white bulb by utilizing a reflection mirror or the like, as the illumination light L. In addition, in the light source 2, it is possible to use light from an internal light source such as a halogen lamp or a tungsten lamp as the illumination light L.

In addition, as the light source 2, a light emitting diode (LED) or the like may be used. In this case, it is possible to configure the light source 2, for example, by the combination of an LED emitting light having a red wavelength, an LED emitting light having a blue wavelength, and an LED emitting light having a green wavelength. In addition, since it is possible to variably control the wavelength of the illumination light emitted from the light source 2 by turning on and off these LEDs having a different wavelength, it is possible to omit a wavelength filter 9 (described later) when such LEDs are used in the light source 2.

The illumination optical system 3 has a configuration in which a first condenser lens 8, the wavelength filter 9, a spatial light modulation element 10, and a second condenser lens 11 are provided in order from the light source 2 side.

The first condenser lens 8 and the second condenser lens 11 focus the illumination light L emitted from the light source 2 onto the specimen S on the stage 7.

The wavelength filter 9 limits the wavelength of the illumination light L within a specific range. As the wavelength filter 9, for example, a band-pass filter that transmits only light having a wavelength in a specific range is used. In addition, the wavelength filter 9 is configured to be removable. A plurality of band-pass filters each transmitting light having a different wavelength are prepared in advance, and by replacing a band-pass filter by another band-pass filter, it is possible to selectively adjust the wavelength of the illumination light L that transmits through the wavelength filter 9.

Note that, since an object of the wavelength filter 9 is to receive light having a specific wavelength in the solid-state imaging device 5, the arrangement of the wavelength filter 9 is not specifically limited. The arrangement is not limited to the above-described configuration in which the wavelength filter 9 is arranged between the first condenser lens 8 and the spatial light modulation element 10, and it is possible to arrange the wavelength filter 9 anywhere in the optical path between the light source 2 and the solid-state imaging device 5.

The spatial light modulation element 10 is arranged at a position which is conjugate with a pupil position of the imaging optical system 4. The spatial light modulation element 10 is an element (diaphragm) used to variably adjust the light intensity distribution of the illumination light L with which the specimen S is irradiated. It is possible to freely change the shape, size, or the like of this diaphragm aperture (region through which the illumination light L passes) 10a.

Figure 2A:
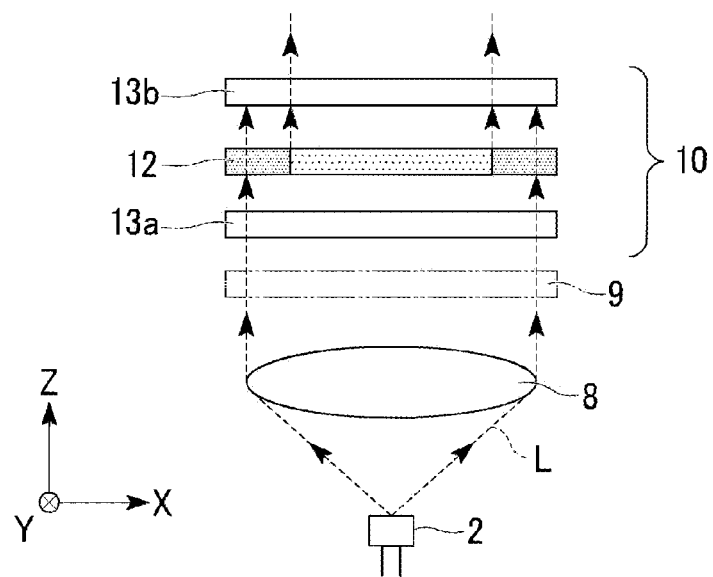
FIG. 2A is a configuration view when a liquid crystal element is used as a spatial light modulation element included in the microscope apparatus.

As the spatial light modulation element 10, for example, it is possible to use a liquid crystal panel (liquid crystal element) 12 as shown in FIG. 2A. Specifically, the spatial light modulation element 10 shown in FIG. 2A has a structure in which polarization plates 13a and 13b as a pair are arranged at both sides of the liquid crystal panel 12, respectively. In the spatial light modulation element 10, by controlling the voltage applied to each dot that is arranged within the plane of the liquid crystal panel 12, it is possible to arbitrarily change the light intensity distribution (the shape, size, or the like of the opening 10a) of the illumination light L with which the specimen S is irradiated.

Figure 2B:
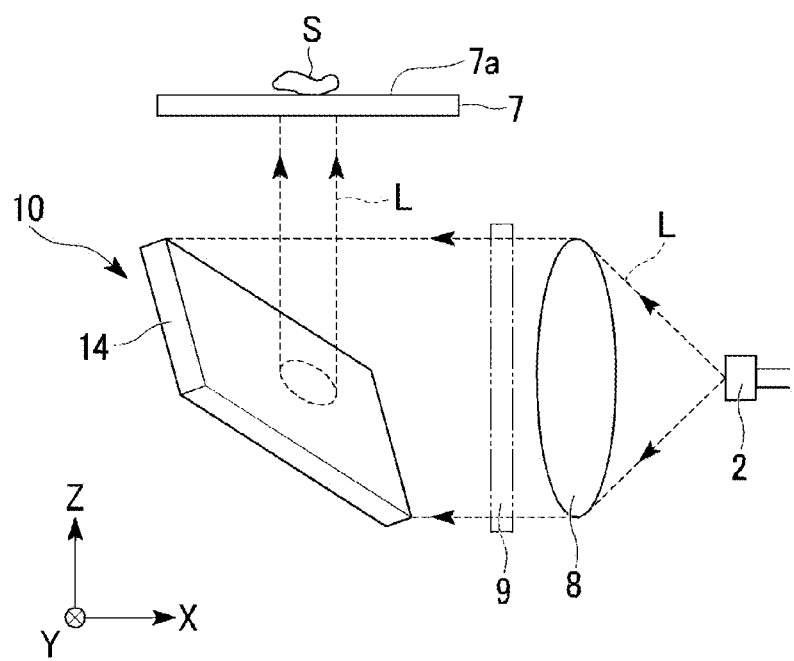
FIG. 2B is a configuration view when a DMD is used as the spatial light modulation element included in the microscope apparatus.

In addition, as the spatial light modulation element 10, for example, it is possible to use a digital mirror device (DMD) 14 as shown in FIG. 2B. Specifically, the DMD 14 is configured by a plurality of micro mirrors which are arranged within a plane and of which the tilt can be changed. In the spatial light modulation element 10, by controlling the reflection direction of the illumination light L while switching arbitrarily the tilt of each mirror, it is possible to arbitrarily change the light intensity distribution (the shape, size, or the like of the opening 10a) of the illumination light L with which the specimen S is irradiated.

As the spatial light modulation element 10, for example, an electrochromic element (not shown in the drawings) may be used. This electrochromic element is configured by a laminate structure in which a transparent electrode and an electrochromic layer are combined. When a voltage is applied to the electrochromic layer, a region of the electrochromic layer to which the voltage is applied reversibly undergoes an electrolytic oxidation or reduction reaction, and it is reversibly changed whether or not the illumination light L transmits through the region.

Accordingly, when such an electrochromic element is used as the spatial light modulation element 10, it is possible to arbitrarily change the light intensity distribution (the shape, size, or the like of the opening 10a) of the illumination light L with which the specimen S is irradiated. Note that, as the electrochromic element, for example, an element disclosed in Japanese Unexamined Patent Application Publication No. H8-220568 or the like can be used.

In addition, as the spatial light modulation element 10, for example, an optical element (not shown in the drawings) that encapsulates an electro-active material of which a specific optical property such as transmittance is changed by the application of an electric stimulus and that has a plurality of spaces in which an electrode such as a TFT is formed may be used. This optical element has sealed cells formed in an array, and each cell encapsulates an electro-active material. Each cell has an electrode formed thereof, and a voltage can be applied independently to each cell. By controlling the voltage applied to each cell, it is possible to reversibly change between a state in which light transmits through the cell and a state in which light does not transmit through the cell.

Accordingly, when such an optical element is used as the spatial light modulation element 10, it is possible to arbitrarily change the light intensity distribution (the shape, size, or the like of the opening 10a) of the illumination light L with which the specimen S is irradiated. Note that, as such an optical element, for example, an element disclosed in Published Japanese Translation No. 2010-507119 of the PCT International Publication can be used.

The imaging optical system 4 is configured to have an objective lens 15, as shown in FIG. 1. The objective lens 15 images the transmitted light Lp from the specimen S onto a light receiving surface of the solid-state imaging device 5.

The solid-state imaging device 5 is configured, for example, by a device including a plurality of light receiving elements each having a different light-receiving wavelength such as a CCD image sensor and a CMOS image sensor. The solid-state imaging device 5 receives the transmitted light Lp imaged by the imaging optical system 4 described above, converts the light into an electric signal (image signal), and outputs the signal to the controller 6.

The controller 6 is configured by a computer (CPU) or the like. The controller 6 performs a control to drive each unit of the microscope apparatus 1 according to a control program stored in the controller 6, or the like. In addition, the controller 6 performs a calculation to implement the control of each unit, or the like. For example, a monitor (display unit) 16 such as a liquid crystal display panel is connected to the controller 6.

In the microscope apparatus 1 having the structure as described above, the illumination light L emitted from the light source 2 passes through the first condenser lens 8 and thereby is converted into parallel illumination light L. Then, this parallel illumination light L transmits through the wavelength filter 9, and thereby illumination light L having a specific wavelength is incident on the spatial light modulation element 10.

Then, the illumination light L that has passed through the opening 10a of the spatial light modulation element 10 passes through the second condenser lens 11 and thereby is converted into parallel illumination light L. Then, the specimen S placed on the installation surface 7a of the stage 7 is irradiated with this parallel illumination light L.

Then, the objective lens 15 images the transmitted light Lp from the specimen S onto the light receiving surface of the solid-state imaging device 5, and thereby the transmitted light Lp received by the solid-state imaging device 5 is converted into an electric signal (image signal) and is output to the controller 6. Thereby, the controller 6 can generate an image of the specimen S and display the image on the monitor 16.

In the microscope apparatus 1 of the present embodiment, in order to obtain an optimum image to observe the specimen S, a control to optimize the light intensity distribution of the illumination light L with which the specimen S is irradiated is performed.

Specifically, the controller 6 performs a control of acquiring a first image of the specimen S generated by the solid-state imaging device 5 when the specimen S is irradiated with first illumination light formed (before an adjustment described below) by the spatial light modulation element 10 (in a first mode) on the basis of the illumination light L from the light source 2.

The controller 6 performs a control of acquiring a second image of the specimen S generated by the solid-state imaging device 5 when the spatial light modulation element 10 (in a second mode) adjusts the light intensity distribution of the first illumination light with which the specimen S is irradiated on the basis of this first image and the specimen S is irradiated with second illumination light formed after the adjustment of the light intensity distribution of the first illumination light by the spatial light modulation element 10.

That is, under the control of the controller 6, the illumination optical system 3 illuminates the specimen S with first illumination light through the spatial light modulation element 10 in a first mode. The solid-state imaging device 5 receives light from the imaging optical system 4 including an image of the specimen S illuminated with the first illumination light. The controller 6 adjusts the spatial light modulation element 10 to be in a second mode on the basis of a signal regarding a first image output from the solid-state imaging device 5. The illumination optical system 3 illuminates the specimen S with second illumination light through the spatial light modulation element 10 in the second mode. The solid-state imaging device 5 receives light from the imaging optical system 4 including an image of the specimen S illuminated with the second illumination light and also outputs a signal regarding a second image.

Figure 3A:
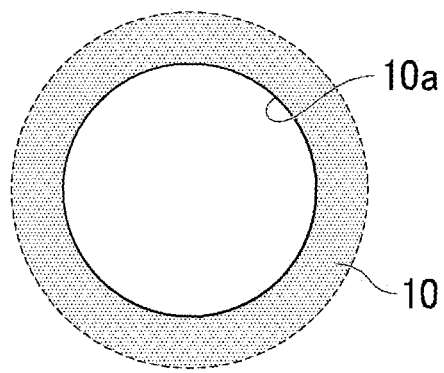
FIG. 3A is a plan view when a diaphragm aperture of the spatial light modulation element is in a circular form.

As the first illumination light, it is possible to use illumination light L having a light intensity distribution which is isotropic in a plane perpendicular to an optical axis of the illumination light. In order to obtain the illumination light L having this isotropic light intensity distribution, for example, the controller 6 controls the spatial light modulation element 10 such that the light intensity distribution of the illumination light L with which the specimen S is irradiated becomes a circular form. That is, a control of setting the diaphragm aperture (the region through which the illumination light L passes) 10a of the spatial light modulation element 10 to be in a circular form, for example, as shown in FIG. 3A is performed.

In addition, the diaphragm aperture (the region through which the illumination light L passes) 10a is a size such that a pupil of the objective lens 15 (objective lens pupil) is completely covered. That is, an outer diameter d of the diaphragm aperture 10a is greater than that of the objective lens pupil.

Figure 3B:
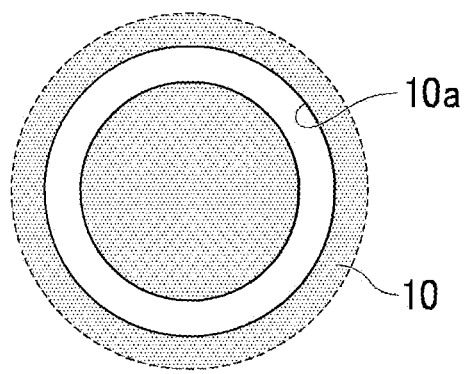
FIG. 3B is a plan view when the diaphragm aperture of the spatial light modulation element is in a circular annular form.

Note that, as the illumination light L having an isotropic light intensity distribution, it is possible to use, for example, illumination light L having an annular light intensity distribution other than the illumination light L having the above-described circular annular light intensity distribution. In this case, the controller 6 performs a control of setting the diaphragm aperture (the region through which the illumination light L passes) 10a of the spatial light modulation element 10 to be in a circular annular form, for example, as shown in FIG. 3B.

Then, the controller 6 acquires the first image of the specimen S generated by the solid-state imaging device 5 when the specimen S is irradiated with the first illumination light. For example, FIG. 4(a) is a microscope photograph showing an example of the first image obtained by using the first illumination light.

Next, the controller 6 performs a control to adjust the light intensity distribution of the illumination light L with which the specimen S is irradiated in order to obtain an optimum image (second image) to observe the specimen S. That is, the controller 6 performs a calculation so as to convert the first illumination light having a light intensity distribution set as one parameter into second illumination light having an optimum light intensity distribution to observe the specimen S.

Specifically, as a calculation method of converting the first illumination light into the second illumination light, first, the controller 6 converts the first image into a binarized image using the Fourier transform.

Figure 4:
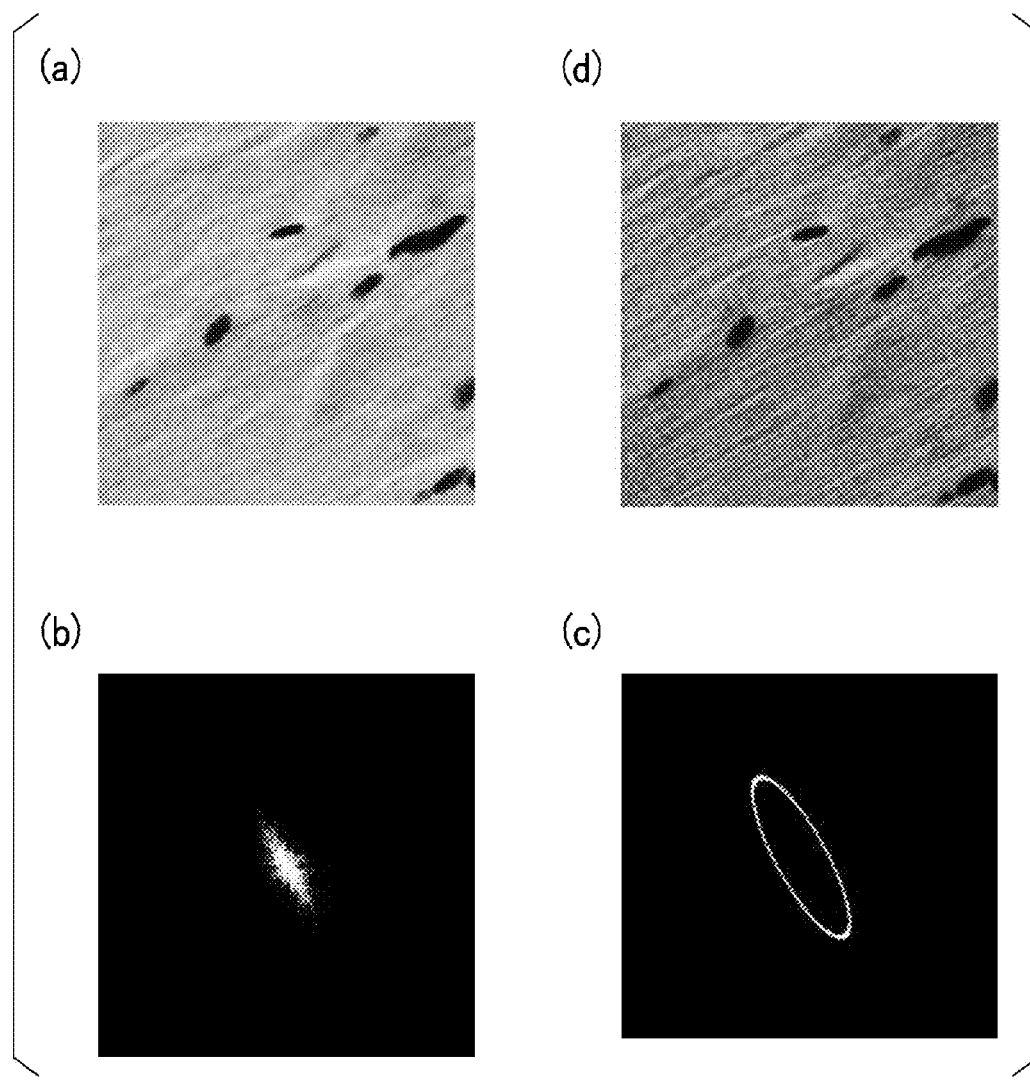
FIG. 4(a) is a microscope photograph showing an example of a first image obtained by using first illumination light, (b) is an image obtained by binarizing the first image using the Fourier transform, (c) is a plan view when the diaphragm aperture of the spatial light modulation element is in an elliptical annular form, and (d) is a microscope photograph showing an example of a second image obtained by using second illumination light.

FIG. 4(b) shows an image obtained by binarizing the first image shown in FIG. 4(a) using the Fourier transform. The binarized image shown in FIG. 4(b) is an image obtained by a calculation in which a predetermined noise level is deducted from a spatial frequency distribution included in the first image shown in FIG. 4(a) and by binarizing the calculation result.

Next, by performing a principal component analysis of the binarized image, the spatial frequency distribution included in the first image is obtained. Specifically, an x-y coordinate system in which a center of the spatial frequency distribution of this binarized image is set as an original point is considered. Then, when an x-y coordinate of the i-th point having a value of not "0" but "1" ($1 \le i \le N$: N is a number of points having a value of "1") of each point of the binarized image is set as ($X_i$, $Y_i$), two eigenvalues of a (2×2) matrix represented by Equation (1) described below is obtained by calculation.

Note that, the principal component analysis of the binarized image is not limited to the above-described principal component analysis. An analysis method other than the above-described principal component analysis can also be used.

[Equation 1]

$$\begin{bmatrix} \sum_{i=1}^{N} x_i x_i / N & \sum_{i=1}^{N} x_i y_i / N \\ \sum_{i=1}^{N} y_i x_i / N & \sum_{i=1}^{N} y_i y_i / N \end{bmatrix} \quad (1)$$

The controller 6 reflects this calculation result to the formation of the second illumination light while analyzing the broadening, directionality, and the like of the spatial frequency distribution included in the first image based on this calculation result and estimating the shape of the specimen S.

That is, the controller 6 performs, on the basis of this calculation result, a control to adjust the light intensity distributions in two directions perpendicular to the optical axis of the illumination light L with which the specimen S is irradiated. Specifically, the controller 6 performs a control to emphasize the light intensity distribution in a direction corresponding to a high spatial frequency component regarding the spatial frequency distribution of the first image, of the light intensity distributions in the two directions. Alternatively or additionally, the controller 6 performs a control to narrow the light intensity distribution in a direction corresponding to a low spatial frequency component regarding the spatial frequency distribution of the first image.

For example, as the second illumination light, illumination light L having an elliptical annular spatial frequency distribution is used.

An example of a parameter setting of the second illumination light is described below. A direction of an eigenvector corresponding to the larger eigenvalue of the two eigenvalues of the matrix represented by Equation (1) is matched with a long axis direction of the elliptical annulus. A long axis length of the elliptical annulus is matched with a pupil diameter of the objective lens 15. A short axis length of the elliptical annulus is the square of "the smaller eigenvalue/the larger eigenvalue" multiplied by the long axis length of the elliptical annulus such that the high frequency component included in the specimen S is emphasized. Thereby, it is possible to obtain second illumination light having an optimum light intensity distribution to observe the specimen S.

The controller 6 performs a control of setting the diaphragm aperture (the region through which the illumination light L passes) 10a of the spatial light modulation element 10 to be in an elliptical annular form, for example, as shown in FIG. 4(c) in order to obtain such second illumination light.

Next, the controller 6 acquires the second image of the specimen S generated by the solid-state imaging device 5 when the specimen S is irradiated with the second illumination light. For example, FIG. 4(d) is a microscope photograph showing an example of the second image obtained by using the second illumination light.

By comparison between the first image shown in FIG. 4(a) and the second image shown in FIG. 4(d), it is found that the resolution of the second image is higher than that of the first image and that the contrast of the second image is also improved compared to that of the first image.

As described above, according to the present embodiment, it is possible to observe the specimen S under optimum conditions by optimizing a light intensity distribution (shape) of the illumination light L with which the specimen S is irradiated and obtaining a high-resolution and high-contrast image of the specimen S.

Note that, as the second illumination light, it is possible to use illumination light L having a light intensity distribution which is anisotropic in the plane perpendicular to the optical axis, specifically illumination light L having an elliptical annular light intensity distribution in the plane perpendicular to the optical axis, by emphasizing the light intensity distribution in the direction corresponding to the high spatial frequency component or narrowing the light intensity distribution in the direction corresponding to the low spatial frequency component as described above.

On the other hand, there may be a case in which the second illumination light has an isotropic light intensity distribution as the optimum light intensity distribution to observe the specimen S based on the calculation result by the controller 6. In this case, not the above-described elliptical annular shape but a circular annular shape is the optimum shape of the light intensity distribution of the illumination light L (second illumination light) with which the specimen S is irradiated.

Figure 5:
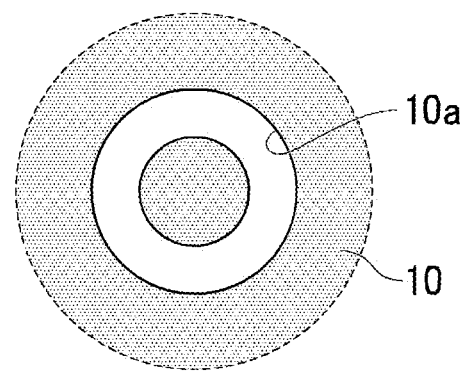
FIG. 5 is a plan view when the diaphragm aperture of the spatial light modulation element is set to be in a circular annular form.

Accordingly, the controller 6 performs a control of setting the diaphragm aperture (the region through which the illumination light L passes) 10a of the spatial light modulation element 10 to be in a circular annular form, for example, as shown in FIG. 5 in order to obtain such second illumination light. Note that, the outer diameter d of the diaphragm aperture 10a is set to an optimum value on the basis of the above calculation result.

In addition, in the case that the spatial frequency distribution of the first image does not exceed a predetermined threshold value based on the calculation result by the controller 6, it is also possible to adjust the light intensity distribution of the illumination light L with which the specimen S is irradiated, to be in a state close to a point light source. That is, in the case that the broadening of the spatial frequency distribution included in the first image is smaller than a predetermined region, it is possible to use not elliptical illumination light L but illumination light L close to a point light source.

Note that, as the second illumination light, not only illumination light L in the annular shape (ring body shape) such as the elliptical annular shape or the circular annular shape described above is used, but also illumination light L having a shape in which part of the annular shape (ring body) is divided may be used.

According to the present embodiment, on the basis of the first image, it is possible to freely change the diaphragm aperture (the region through which the illumination light L passes) 10a in the spatial light modulation element 10 in order to obtain second illumination light having an optimum light intensity distribution to which the broadening, directionality, and the like of the spatial frequency distribution of the first image are reflected.

Figure 6:
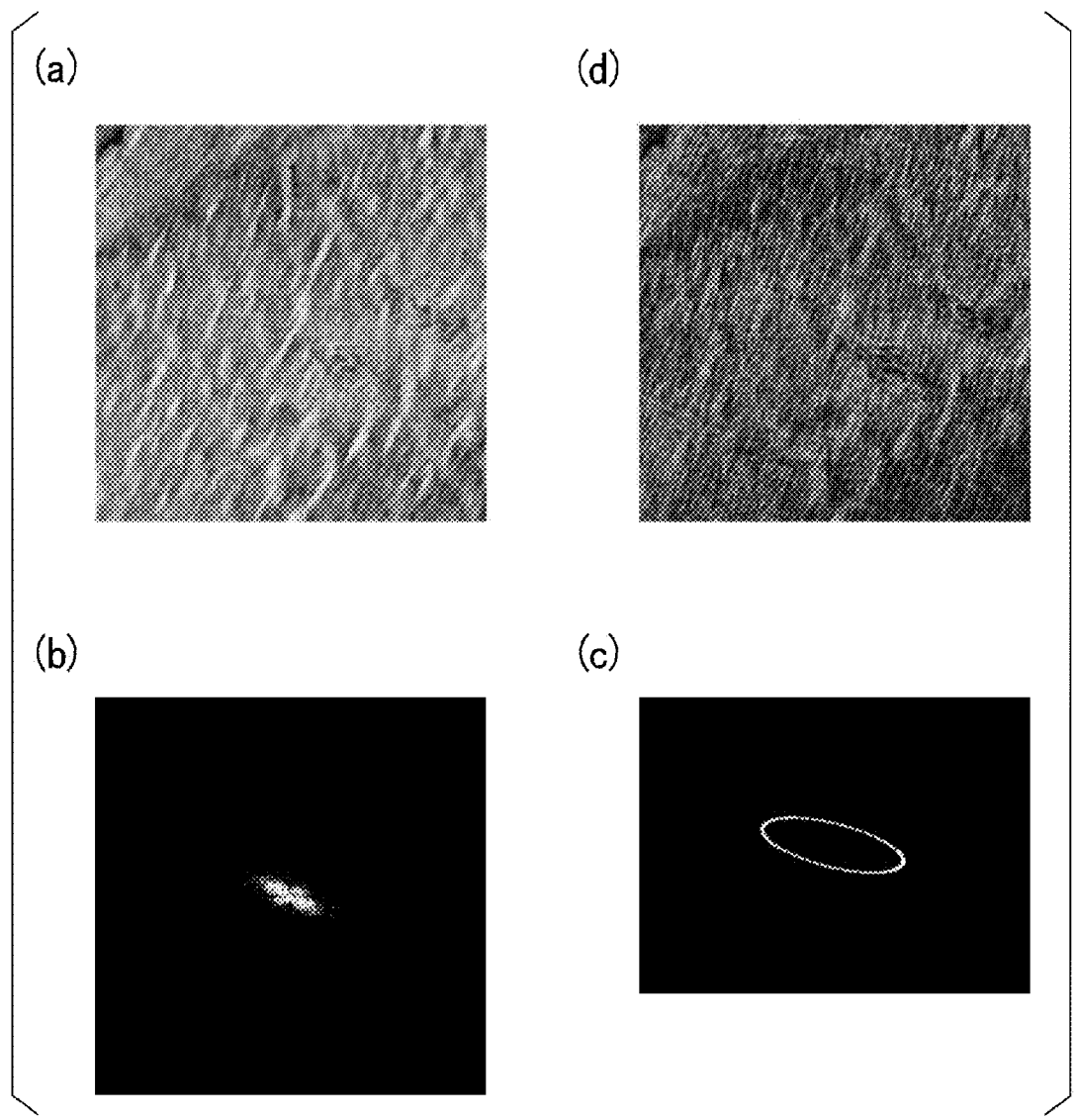
FIG. 6 is an image of another specimen observed by the microscope apparatus.
Figure 7:
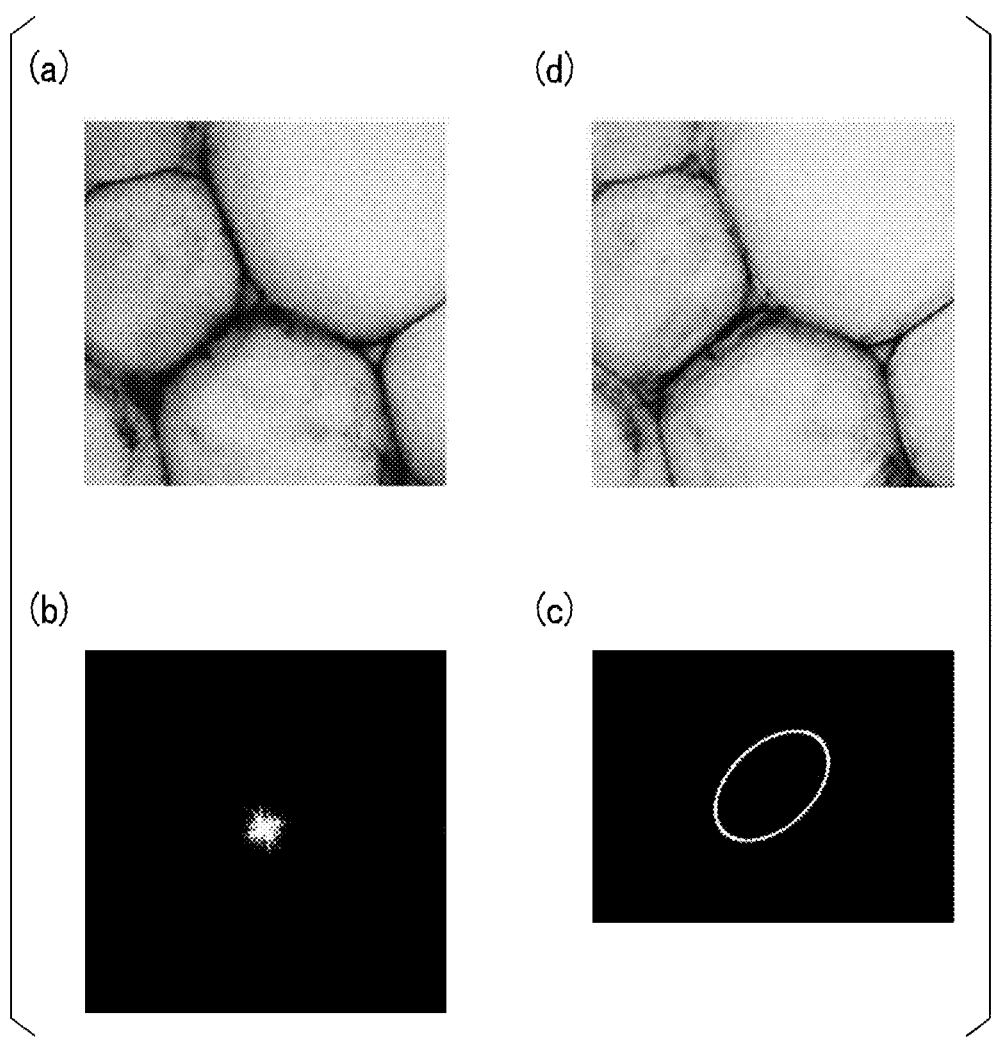
FIG. 7 is an image of still another specimen observed by the microscope apparatus.

In addition, images of another specimen S observed by the microscope apparatus 1 are shown in FIG. 6 and FIG. 7. Of the images shown in FIG. 6 and FIG. 7, (a) shows a first image obtained by using first illumination light, (b) shows an image obtained by binarizing the first image using the Fourier transform, (c) shows a plan view when the diaphragm aperture of the spatial light modulation element is set to be in an elliptical annular form, and (d) shows a second image obtained by using second illumination light.

As shown in FIG. 6 and FIG. 7, with respect to both figures, it is found that the resolution of the second image is higher than that of the first image and that the contrast of the second image is also improved compared to that of the first image.

Second Embodiment

Next, a microscope apparatus 50 shown in FIG. 8 will be described as a second embodiment.

Figure 8:
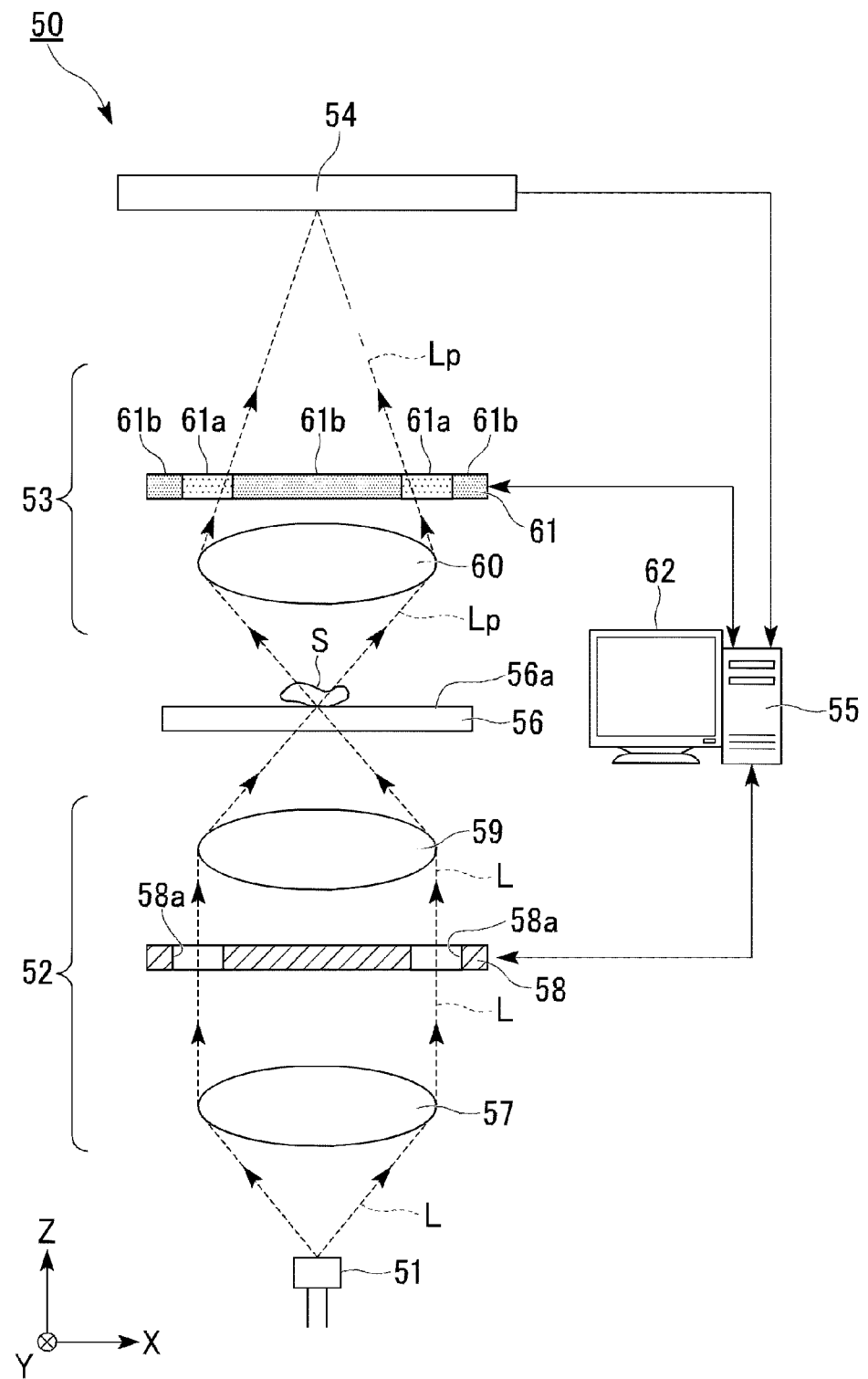
FIG. 8 is a schematic configuration view of a microscope apparatus shown as a second embodiment.

FIG. 8 is a schematic configuration view of the microscope apparatus 50 shown as the second embodiment.

The microscope apparatus 50 shown in FIG. 8 as the second embodiment configures a phase contrast microscope used to irradiate a specimen S which is an observation target with illumination light L and to observe a magnified image of the specimen S obtained by converting a phase contrast of transmitted light Lp from the specimen S into an amplitude contrast.

Specifically, the microscope apparatus 50 includes: a light source 51 that emits illumination light L; an illumination optical system 52 that irradiates a specimen S with the illumination light L from the light source 51; an imaging optical system 53 that images transmitted light Lp from the specimen S; a solid-state imaging device 54 that receives the transmitted light Lp imaged by the imaging optical system 53, converts the transmitted light into an electric signal, and generates an image of the specimen S; and a controller 55 that performs a control of each unit.

A stage 56 is provided between the illumination optical system 52 and the imaging optical system 53.

The stage 56 has an installation surface 56a on which the specimen S is placed. In addition, the stage 56 is operable to be moved in two directions perpendicular to each other in the plane of the stage (an X-axis direction and a Y-axis direction shown in FIG. 8). Thereby, it is possible to arbitrarily change an observation position of the specimen S. Moreover, the stage 56 may be configured to be operable to be moved in a height direction (a Z-axis direction shown in FIG. 8).

In the following description, an optical axis (a central axis of a beam) of the illumination light L emitted from the light source 51 is set to the Z-axis direction, and two directions perpendicular to each other in a plane perpendicular to this Z-axis are set to the X-axis direction and the Y-axis direction. Note that, in FIG. 8, the illumination light L emitted from the light source 51 is schematically represented by a dashed line.

The light source 51 irradiates the specimen, for example, with visible light such as white light or light in a wavelength range adjacent to the visible wavelength range as the illumination light L. In the light source 51, it is possible to use light from an external light source such as natural light, white fluorescent light, or a white bulb by utilizing a reflection mirror or the like, as the illumination light L. In addition, in the light source 51, it is possible to use light from an internal light source such as a halogen lamp or a tungsten lamp as the illumination light L.

In addition, as the light source 51, a light emitting diode (LED) or the like may be used. In this case, it is possible to configure the light source 51, for example, by the combination of an LED emitting light having a red wavelength, an LED emitting light having a blue wavelength, and an LED emitting light having a green wavelength. In addition, it is possible to variably control the wavelength of the illumination light emitted from the light source 51 by turning on and off these LEDs having a different wavelength.

The illumination optical system 52 has a configuration in which a first condenser lens 57, a first spatial light modulation element 58, and a second condenser lens 59 are provided in order from the light source 51 side.

The first condenser lens 57 and the second condenser lens 59 focus the illumination light L emitted from the light source 51 onto the specimen S on the stage 56.

The first spatial light modulation element 58 is arranged at a position which is conjugate with a pupil position of the imaging optical system 53. The first spatial light modulation element 58 is an element (diaphragm) used to variably adjust the light intensity distribution of the illumination light L with which the specimen S is irradiated. It is possible to freely change the shape, size, or the like of this diaphragm aperture (region through which the illumination light L passes) 58a. As the first spatial light modulation element 58, the same element as the spatial light modulation element 10 shown in FIG. 1 can be used.

The imaging optical system 53 has a configuration in which an objective lens 60 and a second spatial light modulation element 61 are provided in order from the stage 56 side.

The objective lens 60 images the transmitted light Lp from the specimen S onto a light receiving surface of the solid-state imaging device 54.

The second spatial light modulation element 61 is arranged at a pupil position of the imaging optical system 53 or a position adjacent to the pupil position. In addition, the first spatial light modulation element 58 and the second spatial light modulation element 61 are arranged at a conjugate position to each other.

The second spatial light modulation element 61 variably adjusts a spatial distribution of a phase added to the transmitted light Lp from the specimen S. The second spatial light modulation element 61, for example, adjusts the phase added to the transmitted light Lp to 0° or ±90°.

Specifically, the second spatial light modulation element 61 includes: a phase modulation region 61a that transmits direct light (zero-order light) which has passed through the specimen S of the transmitted light Lp from the specimen S to be in a state where the phase is shifted by a quarter wavelength (±90°); and a diffracted light transmission region 61b that surrounds this phase modulation region 61a and transmits diffracted light which is diffracted by the specimen S with no phase change (0°).

It is possible to freely change the shape, size, or the like of the phase modulation region 61a of the second spatial light modulation element 61 relative to the diffracted light transmission region 61b. As such a second spatial light modulation element 61, for example, it is possible to use a liquid crystal panel (liquid crystal element) or the like.

Moreover, the second spatial light modulation element 61 can include a function to variably adjust a spatial distribution of transmissivity in which the transmitted light Lp from the specimen S is transmitted, in addition to the spatial distribution of a phase described above. In general, since the light intensity of direct light transmitted through the phase modulation region 61a of the transmitted light Lp transmitted through the second spatial light modulation element 61 is stronger than that of the diffracted light transmitted through the diffracted light transmission region 61b, an adjustment to weaken the light intensity is performed using an ND filter or the like.

Note that, as such an ND filter, for example, it is possible to use an optical element capable of variably adjusting a spatial distribution of transmissivity as disclosed in Published Japanese Translation No. 2010-507119 of the PCT International Publication, or the like. In addition, as the second spatial light modulation element 61, it is possible to use an element to which such an optical element or the like is added.

The solid-state imaging device 54 is configured, for example, by a device including a plurality of light receiving elements each having a different light-receiving wavelength such as a CCD image sensor and a CMOS image sensor. The solid-state imaging device 54 receives the transmitted light Lp imaged by the imaging optical system 53 described above, converts the light into an electric signal (image signal), and outputs the signal to the controller 55.

The controller 55 is configured by a computer (CPU) or the like and performs a control to drive each unit of the microscope apparatus 50 according to a control program stored in the controller 55, or the like. In addition, the controller 55 performs a calculation to implement the control of each unit, or the like. For example, a monitor (display unit) 62 such as a liquid crystal display panel is connected to the controller 55.

In the microscope apparatus 50 having the structure as described above, the illumination light L emitted from the light source 51 passes through the first condenser lens 57 and thereby is converted into parallel illumination light L. Then, this parallel illumination light L is incident on the first spatial light modulation element 58.

Then, the illumination light L that has passed through the opening 58a of the first spatial light modulation element 58 passes through the second condenser lens 59 and thereby is converted into parallel illumination light L. Then, the specimen S placed on the installation surface 56a of the stage 56 is irradiated with this parallel illumination light L.

The transmitted light Lp from the specimen S passes through the objective lens 60 and then is incident on the second spatial light modulation element 61. At this time, direct light which has been transmitted through the phase modulation region 61a of the transmitted light Lp from the specimen S in a state where the phase is shifted by a quarter wavelength is attenuated by the ND filter and then is imaged onto the light receiving surface of the solid-state imaging device 54. On the other hand, the diffracted light that has been transmitted through the diffracted light transmission region 61b with no phase change (0°) is imaged onto the light receiving surface of the solid-state imaging device 54. In the phase contrast microscope, by the interference between the straight propagating light and the diffracted light, the change of a phase can be observed as the brightness and darkness of light (amplitude contrast of light).

Then, the transmitted light Lp received by the solid-state imaging device 54 is converted into an electric signal (image signal) and is output to the controller 55. Thereby, the controller 55 can generate an image of the specimen S and display the image on the monitor 62.

In the microscope apparatus 50 of the present embodiment, in order to obtain an optimum image to observe the specimen S, a control to optimize the light intensity distribution of the illumination light L with which the specimen S is irradiated and the spatial distribution of a phase added to the transmitted light Lp from the specimen S is performed.

Specifically, the controller 55 performs a control of acquiring a first image of the specimen S generated by the solid-state imaging device 54 when the specimen S is irradiated with first illumination light formed (before an adjustment described below) on the basis of the illumination light L from the light source 51 by the first spatial light modulation element 58 (in an A1 mode) and the second spatial light modulation element 61 (in a B1 mode) transmits the transmitted light from the specimen S.

The controller 55 performs a control, based on the first image, in which the first spatial light modulation element 58 adjusts the light intensity distribution of the first illumination light with which the specimen S is irradiated and the second spatial light modulation element 61 adjusts the spatial distribution of a phase added to the transmitted light from the specimen S.

Moreover, the controller 55 performs a control of acquiring a second image of the specimen S generated by the solid-state imaging device 54 when the specimen S is irradiated with second illumination light formed after the adjustment of the light intensity distribution of the first illumination light by the first spatial light modulation element 58 (in an A2 mode) and the second spatial light modulation element 61 (in a B2 mode) adjusts the spatial distribution of a phase added to the transmitted light.

That is, under the control of the controller 55, the illumination optical system 52 illuminates the specimen S with first illumination light through the first spatial light modulation element 58 in an A1 mode. The imaging optical system 53 forms, via the second spatial light modulation element 61 in a B1 mode, an image of the specimen S illuminated with the first illumination light. The solid-state imaging device 54 receives light from the imaging optical system 53 including the image of the specimen S illuminated with the first illumination light. The controller 55 adjusts the first spatial light modulation element 58 to be in an A2 mode and the second spatial light modulation element 61 to be in a B2 mode on the basis of a signal regarding a first image output from the solid-state imaging device 53. The illumination optical system 52 illuminates the specimen S with second illumination light through the first spatial light modulation element 58 in the A2 mode. The imaging optical system 53 forms, via the second spatial light modulation element 61 in the B2 mode, an image of the specimen S illuminated with the second illumination light. The solid-state imaging device 54 receives light from the imaging optical system 53 including an image of the specimen S illuminated with the second illumination light and also outputs a signal regarding a second image.

Figure 9A:
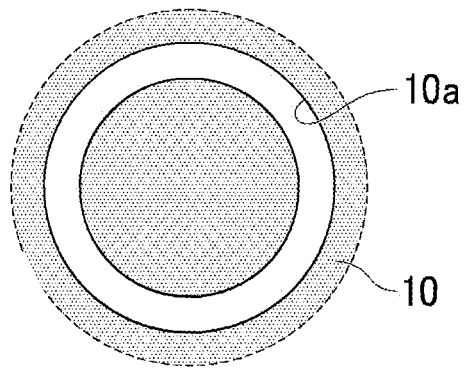
FIG. 9A is a plan view when the diaphragm aperture of a first spatial light modulation element is set to be in a circular annular form.

Regarding the first illumination light, the controller 55 controls the first spatial light modulation element 58 such that the light intensity distribution of the illumination light L with which the specimen S is irradiated is in a circular annular form. That is, the controller 55 performs a control of setting the diaphragm aperture (region through which the illumination light L passes) 58a of the first spatial light modulation element 58 to be in a circular annular form, for example, as shown in FIG. 9A.

In addition, the diaphragm aperture (the region through which the illumination light L passes) 58a is set to be in a size such that a pupil of the objective lens 60 (objective lens pupil) is completely covered. That is, an outer diameter d of the diaphragm aperture 58a is greater than that of the objective lens pupil.

Figure 9B:
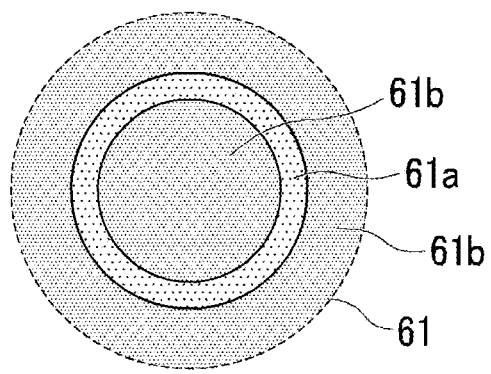
FIG. 9B is a plan view when a phase adjustment region of a second spatial light modulation element is in a circular annular form.

Regarding the second spatial light modulation element 61, as shown in FIG. 9B, the controller 55 controls the second spatial light modulation element 61 such that the shape of the phase modulation region 61a relative to the diffracted light transmission region 61b is a shape corresponding to the diaphragm aperture (region through which the illumination light L passes) 58a of the first spatial light modulation element 58, that is, a circular annular form.

Then, the controller 55 acquires a first image of the specimen S generated by the solid-state imaging device 54 when the specimen S is irradiated with the first illumination light and the second spatial light modulation element 61 transmits the transmitted light from the specimen S.

Next, the controller 55 performs a control to adjust the light intensity distribution of the illumination light L with which the specimen S is irradiated in order to obtain an optimum image (second image) to observe the specimen S. That is, the controller 55 performs a calculation so as to convert the first illumination light having a light intensity distribution set as one parameter into second illumination light having an optimum light intensity distribution to observe the specimen S.

Specifically, as a calculation method of converting the first illumination light into the second illumination light, the controller 55 can use the same calculation method as that of the above first embodiment. That is, by using the same calculation method as that of the first embodiment, the controller 55 analyzes the broadening, directionality, and the like of the spatial frequency distribution included in the above first image, estimates the shape of the specimen S, and reflects this calculation result to the formation of the second illumination light. Thereby, it is possible to obtain second illumination light having an optimum light intensity distribution to observe the specimen S.

Figure 10A:
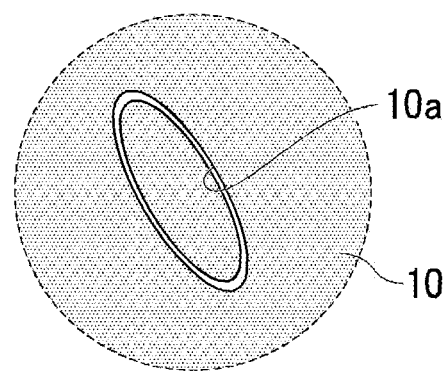
FIG. 10A is a plan view when the diaphragm aperture of the first spatial light modulation element is in an elliptical annular form.

The controller 55 performs a control of setting the diaphragm aperture (region through which the illumination light L passes) 58a of the first spatial light modulation element 58 to be in an elliptical annular form, for example, as shown in FIG. 10A in order to obtain such second illumination light.

Figure 10B:
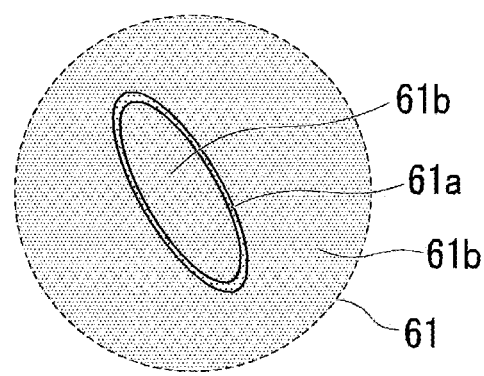
FIG. 10B is a plan view when the phase adjustment region of the second spatial light modulation element is in an elliptical annular form.

In addition, regarding the second spatial light modulation element 61, the controller 55 controls the second spatial light modulation element 61 such that the shape of the phase modulation region 61a relative to the diffracted light transmission region 61b is a shape corresponding to the diaphragm aperture (region through which the illumination light L passes) 58a of the first spatial light modulation element 58, that is, an elliptical annular form as shown in FIG. 10B.

In this way, the controller 55 performs the adjustment of the first spatial light modulation element 58 and the adjustment of the second spatial light modulation element 61 while synchronizing the first spatial light modulation element 58 and the second spatial light modulation element 61 to each other such that the shape of the aperture (region through which the illumination light L passes) 58a of the first spatial light modulation element 58 is always conjugate with the shape of the phase modulation region 61a of the second spatial light modulation element 61.

Next, the controller 55 acquires a second image of the specimen S generated by the solid-state imaging device 54 when the specimen S is irradiated with the second illumination light and the second spatial light modulation element 61 adjusts the spatial distribution of a phase added to the transmitted light. Thereby, it is possible to obtain a second image having a higher resolution and a higher contrast than those of the first image.

As described above, according to the present embodiment, it is possible to observe the specimen S under optimum conditions by optimizing a light intensity distribution (shape) of the illumination light L with which the specimen S is irradiated and a spatial distribution of a phase added to the transmitted light Lp from the specimen S and obtaining a high-resolution and high-contrast image of the specimen S.

Note that, the present invention is not necessarily limited to the above-described embodiments and a variety of modifications can be made to the above-described embodiments without departing from the scope of the present invention.

For example, the microscope apparatus of the present invention may be an apparatus that configures a dark field microscope used to observe a magnified image of a specimen S obtained by reflected light or scattered light from the specimen S or the like, other than an apparatus that configures a bright field microscope or a phase contrast microscope described above.

In addition, when the image of the specimen S is displayed on the monitors 16, 62 described above, it is possible not only to display the above first image and the above second image separately, but also to display the first image and the second image side by side.

In addition, the microscope apparatus of the present invention is not limited to an apparatus used to observe an image of a specimen S displayed on the monitors 16, 62, and may be an apparatus used to observe an image of a specimen S through an eyepiece (not shown in the drawing).

What is claimed is:

1. A microscope apparatus comprising:
   a light source;
   an illumination optical system configured to illuminate a specimen with light from the light source, the illumination optical system having a spatial light modulation element capable of adjusting a light intensity distribution;
   an imaging optical system configured to image light from the specimen;
   a solid-state imaging device configured to generate an image of the specimen based on light from the imaging optical system; and
   a controller capable of adjusting the spatial light modulation element, the controller being configured to, based on a first image output from the solid-state imaging device when the specimen is illuminated with first illumination light, adjust the spatial light modulation element and illuminate the specimen with second illumination light,
   wherein the controller performs a calculation so as to convert the first illumination light into the second illumination light,
   the spatial light modulation element adjusts, based on a result of the calculation, a light intensity distribution of illumination light with which the specimen is irradiated,
   the controller converts the first image into a binarized image using a Fourier transform, then performs a principal component analysis of the binarized image, and thereby obtains a spatial frequency distribution included in the first image, and
   the spatial light modulation element adjusts, based on the spatial frequency distribution of the first image, light intensity distributions in two directions perpendicular to an optical axis.

2. The microscope apparatus according to claim 1, wherein
   the spatial light modulation element performs an adjustment to emphasize a light intensity distribution in a direction corresponding to high spatial frequency component regarding the spatial frequency distribution of the first image, of the light intensity distributions in two directions, and/or to narrow a light intensity distribution in a direction corresponding to a low spatial frequency component regarding the spatial frequency distribution of the first image.

3. The microscope apparatus according to claim 2, wherein
   the first illumination light has a light intensity distribution which is isotropic in a plane perpendicular to the optical axis, and the second illumination light has a light intensity distribution which is anisotropic or isotropic in a plane perpendicular to the optical axis.

4. The microscope apparatus according to claim 3, wherein
   the first illumination light has a light intensity distribution of a circular annular form or a circular form in a plane perpendicular to the optical axis, and the second illumination light has a light intensity distribution of an elliptical annular form or a circular annular form in a plane perpendicular to the optical axis.

5. The microscope apparatus according to claim 1, wherein
   the spatial light modulation element adjusts a light intensity distribution of illumination light with which the specimen is irradiated, to be substantially the same as a light intensity distribution of a point light source, when the spatial frequency distribution does not exceed a predetermined threshold value.

6. The microscope apparatus according to claim 1, wherein
   the illumination optical system includes a first spatial light modulation element used to variably adjust a light intensity distribution of illumination light with which the specimen is irradiated,
   the imaging optical system includes a second spatial light modulation element used to variably adjusts a spatial distribution of a phase added to transmitted light from the specimen,
   the controller acquires a first image of the specimen generated by the solid-state imaging device when the specimen is irradiated with first illumination light formed based on illumination light from the light source by the first spatial light modulation element and the second spatial light modulation element transmits the transmitted light from the specimen,
   based on the first image, the first spatial light modulation element adjusts a light intensity distribution of the first illumination light with which the specimen is irradiated and the second spatial light modulation element adjusts the spatial distribution of the phase added to the transmitted light from the specimen, and
   the controller performs a control of acquiring a second image of the specimen generated by the solid-state imaging device when the specimen is irradiated with second illumination light formed after the first spatial light modulation element adjusts the light intensity distribution of the first illumination light and the second spatial light modulation element adjusts the spatial distribution of the phase added to the transmitted light.

7. The microscope apparatus according to claim 6, wherein
   the second spatial light modulation element includes: a phase modulation region configured to transmit the transmitted light from the specimen to be in a state where a phase is shifted by a quarter wavelength; and a transmission region surrounding the phase modulation region and configured to transmit the transmitted light from the specimen with no phase change, and variably adjusts the phase modulation region relative to the transmission region.

8. The microscope apparatus according to claim 7, wherein
the second spatial light modulation element adjusts a shape of the phase modulation region relative to the transmission region to a shape corresponding to a light intensity distribution of illumination light adjusted by the first spatial light modulation element.

9. The microscope apparatus according to claim 6, wherein
the second spatial light modulation element variably adjusts the spatial distribution of the phase and a spatial distribution of transmissivity in which the transmitted light from the specimen is transmitted.

10. The microscope apparatus according to claim 6, wherein
the first spatial light modulation element and the second spatial light modulation element are synchronized to each other to perform the adjustment by the first spatial light modulation element and the adjustment by the second spatial light modulation element.

11. The microscope apparatus according to claim 6, wherein
the second spatial light modulation element is a liquid crystal element.

12. The microscope apparatus according to claim 1, wherein
the imaging optical system receives at least one of transmitted light, reflected light, and scattered light from the specimen.

13. The microscope apparatus according to claim 1, wherein
the spatial light modulation element is any of a liquid crystal element, an electrochromic element, and a digital micro mirror device.

14. The microscope apparatus according to claim 1, wherein
the solid-state imaging device is any of a CCD image sensor and a CMOS image sensor.

15. A microscope apparatus comprising:
a light source;
an illumination optical system configured to illuminate a specimen with light from the light source, the illumination optical system having a spatial light modulation element capable of adjusting a light intensity distribution;
an imaging optical system configured to image light from the specimen;
a solid-state imaging device configured to generate an image of the specimen based on light from the imaging optical system; and
a controller capable of adjusting the spatial light modulation element, the controller being configured to, based on a first image output from the solid-state imaging device when the specimen is illuminated with first illumination light, adjust the spatial light modulation element and illuminate the specimen with second illumination light,
wherein the illumination optical system includes a first spatial light modulation element used to variably adjust a light intensity distribution of illumination light with which the specimen is irradiated,
the imaging optical system includes a second spatial light modulation element used to variably adjusts a spatial distribution of a phase added to transmitted light from the specimen,
the controller acquires a first image of the specimen generated by the solid-state imaging device when the specimen is irradiated with first illumination light formed based on illumination light from the light source by the first spatial light modulation element and the second spatial light modulation element transmits the transmitted light from the specimen,
based on the first image, the first spatial light modulation element adjusts a light intensity distribution of the first illumination light with which the specimen is irradiated and the second spatial light modulation element adjusts the spatial distribution of the phase added to the transmitted light from the specimen, and
the controller performs a control of acquiring a second image of the specimen generated by the solid-state imaging device when the specimen is irradiated with second illumination light formed after the first spatial light modulation element adjusts the light intensity distribution of the first illumination light and the second spatial light modulation element adjusts the spatial distribution of the phase added to the transmitted light.

16. The microscope apparatus according to claim 15, wherein
the second spatial light modulation element includes: a phase modulation region configured to transmit the transmitted light from the specimen to be in a state where a phase is shifted by a quarter wavelength; and a transmission region surrounding the phase modulation region and configured to transmit the transmitted light from the specimen with no phase change, and variably adjusts the phase modulation region relative to the transmission region.

17. The microscope apparatus according to claim 16, wherein
the second spatial light modulation element adjusts a shape of the phase modulation region relative to the transmission region to a shape corresponding to a light intensity distribution of illumination light adjusted by the first spatial light modulation element.

18. The microscope apparatus according to claim 15, wherein
the second spatial light modulation element variably adjusts the spatial distribution of the phase and a spatial distribution of transmissivity in which the transmitted light from the specimen is transmitted.

19. The microscope apparatus according to claim 15, wherein
the first spatial light modulation element and the second spatial light modulation element are synchronized to each other to perform the adjustment by the first spatial light modulation element and the adjustment by the second spatial light modulation element.

20. The microscope apparatus according to claim 15, wherein
the second spatial light modulation element is a liquid crystal element.

* * * * *